(12) United States Patent
Griffin, Jr. et al.

(10) Patent No.: US 8,111,044 B2
(45) Date of Patent: Feb. 7, 2012

(54) AUXILIARY POWER ADAPTER HAVING DEVICE CONTROLS

(75) Inventors: Paul P. Griffin, Jr., Nashville, TN (US); Takahiko Suzuki, Nagano (JP)

(73) Assignee: Griffin Technology Inc., Nashville, TN (US)

( * ) Notice: Subject to any disclaimer, the term of this patent is extended or adjusted under 35 U.S.C. 154(b) by 1173 days.

(21) Appl. No.: 11/779,883

(22) Filed: Jul. 19, 2007

(65) Prior Publication Data
US 2008/0015717 A1    Jan. 17, 2008

Related U.S. Application Data

(63) Continuation-in-part of application No. 11/367,622, filed on Mar. 3, 2006, now Pat. No. 7,679,322.

(51) Int. Cl.
*H02J 7/00* (2006.01)
*H04B 1/08* (2006.01)
*H04B 1/38* (2006.01)
*F21L 4/00* (2006.01)

(52) U.S. Cl. ........ 320/114; 320/107; 320/110; 320/111; 320/112; 455/347; 362/183

(58) Field of Classification Search ................... 320/114
See application file for complete search history.

(56) References Cited

U.S. PATENT DOCUMENTS 6,215,276 B1 * 4/2001 Smith ........................... 320/111
2002/0132651 A1 * 9/2002 Jinnouchi ..................... 455/573
* cited by examiner

*Primary Examiner* — Yalkew Fantu
(74) *Attorney, Agent, or Firm* — Hornkohl Intellectual Property Law; Jason L. Hornkohl

(57) ABSTRACT

An accessory for a portable electronic device, such as a digital music player, includes a set of device controls for controlling the portable electronic device. The accessory includes a microprocessor and a memory that contains function codes corresponding to the functions selected by the controls. Preferably, the accessory is a charger is adapted to be inserted into for a 12-volt car auxiliary power outlet and the protruding face of the charger body is a click wheel controller that rotates. The accessory may also include a FM transmitter for transmitting an audio signal received from the portable electronic device to the car stereo and a verification system for insuring the charger is produced by an authorized supplier.

17 Claims, 3 Drawing Sheets

AUXILIARY POWER ADAPTER HAVING DEVICE CONTROLS

CROSS-REFERENCES TO RELATED APPLICATIONS

This application is a Continuation-In-Part application which claims benefit of U.S. patent application Ser. No. 11/867,622 filed Mar. 8, 2006 now U.S. Pat. No. 7,679,322, entitled "Auxiliary Power Adapter Having Device Controls" which is hereby incorporated by reference.

STATEMENT REGARDING FEDERALLY SPONSORED RESEARCH OR DEVELOPMENT

Not applicable

REFERENCE TO SEQUENCE LISTING OR COMPUTER PROGRAM LISTING APPENDIX

Not applicable

FIELD OF THE INVENTION

The present invention is generally directed toward the field of accessories for portable electronic devices. More particularly, an embodiment of the present invention is directed toward an accessory for a digital music player that is adapted be mounted in an auxiliary power outlet and has controls for the digital music player on the accessory body.

BACKGROUND OF THE INVENTION

Many digital music players, such as MP3 players, use 12-volt auxiliary power adapters for charging the player while in the car. The adapter is inserted in the 12-volt car outlet and is plugged into the player through its docking port or input connector to charge the player's battery. The user may place the player in the passenger seat or a holder and listen to music while the player charges. However, if the listener wants to skip a song or pause the player, the listener must locate the player and manipulate its controls. Unfortunately, digital music players are often very small and have small control knobs that are difficult to operate when driving a car. Therefore, what is needed is a new way to control a digital music player when charging it in your car.

BRIEF SUMMARY OF THE INVENTION

An embodiment of the present invention is directed toward a charger for a portable electronic device. The charger includes a charger body dimensioned to couple with a 12-volt car outlet. The face of the charger body rotates such that a user can select a function of the portable electronic device by rotating the face of the charter body. The rotating face of the charger preferably is a click wheel that controls a pause, play, and rewind function of the digital music player. The rotating face also preferably provides tactile feed back to a user. The charger preferably includes a transmitter for transmitting an output of the portable electronic device to a remote receiver. A verification system of the charger interacts with a verification system of the portable electronic device to insure that the charger is produced by an authorized partner of an entity producing the portable electronic device.

Another embodiment of the present invention is directed toward an accessory for a portable electronic device such as an Apple iPod™. The accessory includes a rotary controller whereby the accessory can transfer control codes to the portable electronic device in response to a user's manipulation of the rotary controller such that a user can implement functions on the portable electronic device with the rotary controller on the accessory. The accessory is a preferably a charger having a charger body configured to fit in a 12-volt car outlet and the rotary controller covers the protruding front face of the charger body. The device is preferably a digital music player and the rotary controller allows a user to pause, play, rewind, or skip songs played by the digital music player. The rotary controller is also preferably a click wheel that provides tactile feedback to a user. The accessory includes a transmitter for wirelessly transmitting the control codes to a receiver in the portable electronic device and a microphone such that a voice signal can be received with the microphone and stored on the portable electronic device. A verification system couples with a verification system of the portable electronic device such that the portable electronic device can verify that the accessory is an authorized accessory.

Yet another embodiment of the present invention is directed toward a charger for a portable media player. The charger includes a charger body for physically and electrically coupling to a 12-volt outlet such that the charger transfers power from the outlet to the portable media player. A protruding face of the charger body rotates and functions as a click wheel controller such that a user can control functions of the portable media player by manipulating the click wheel of the charger. The click wheel allows a user to play, pause or skip a song playing on the portable media player. The charger preferably includes a transmitter for transmitting an output of the portable media player to a remote receiver and a verification system that insures that the charger is compatible with the portable media player.

DETAILED DESCRIPTION OF THE INVENTION

Figure 1:
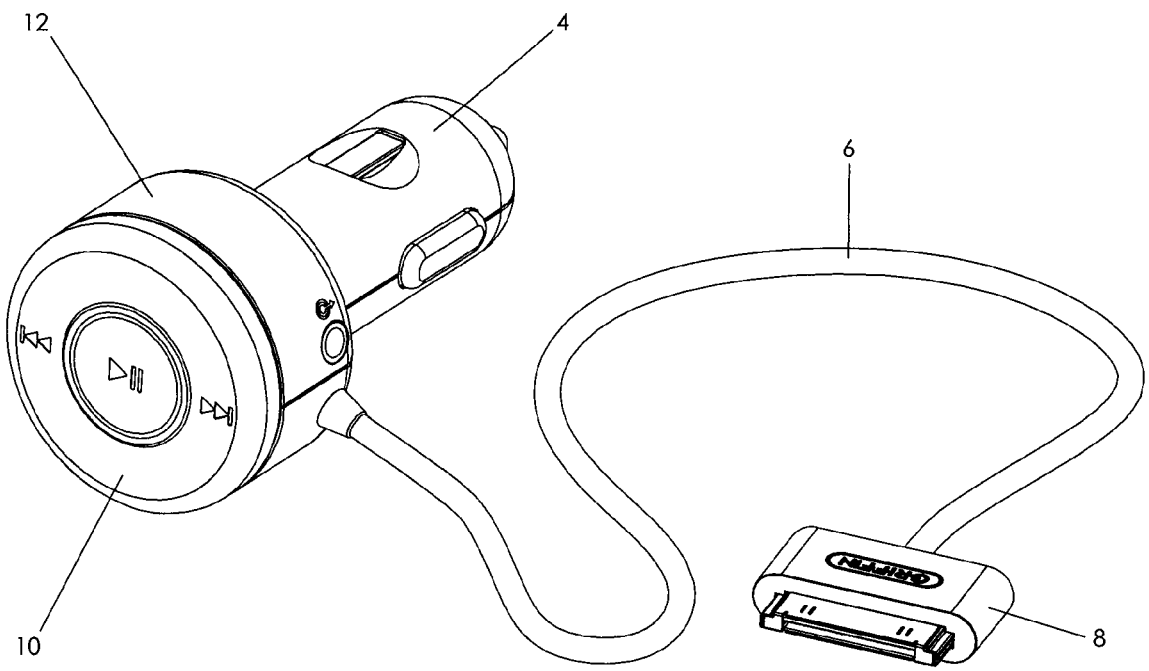
FIG. 1 is an illustration of a car charger for a portable electronic device constructed in accordance with an embodiment of the present invention.

Referring to FIG. 1, an illustration of car charger 2 for a portable electronic device constructed in accordance with an embodiment of the present invention is shown. The car charger 2 has body portion 4 that is adapted to be inserted into the 12-volt auxiliary power output, i.e., cigarette lighter, of an automobile. The charger body 4 transfers power from the power outlet to the portable electronic device through a cable 6 with a connector 8 that is adapted to be coupled to the device. A series of user controls 10, preferably buttons, are positioned on the upper face 12 of the body portion 4. These controls 10 are used to control functions, such as play, pause, volume, etc. of the portable electronic device. This is accomplished by positioning a microprocessor in the adapter body 4 that is able to communicate with the electronic device through a communication link that is bundled in the cable 6 with the wire used to carry power to the device. In an alternative embodiment of the present invention, the adapter body 4 may communicate with the electronic device through the use of a wireless RF frequency data link. However, a direct coupling will be required if a charging function is desired in the charger body 4. When a user presses a button 10 on the charger body 4, the microprocessor retrieves a code associated with the selected function from a memory and sends the code to the electronic device through a connection in the cable 6. The device then performs the requested function. A most preferred set of controls 10 is a play, pause, rewind, skip and stop and a volume up/down for a digital music player to which the device is coupled. However, the controls 10 could be varied to any desired control that was relevant to the device which the charger 2 is used with. A display 14 may also be included on the face 12 that displays a status of the device to which the charger 2 is coupled.

In an alternative embodiment, the charger may include a transmitter for transmitting a signal received from the electronic device over the cable 6 to a remote receiver. For example, an FM transmitter can be included such that an audio signal received by the charger 2 from a digital music player can be broadcast from the charger 2 to the car radio. In such an embodiment, the controls for the transmitter are also placed on the top of the body portion 4 of the charger along with the controls 10 for the digital music player.

Figure 2:
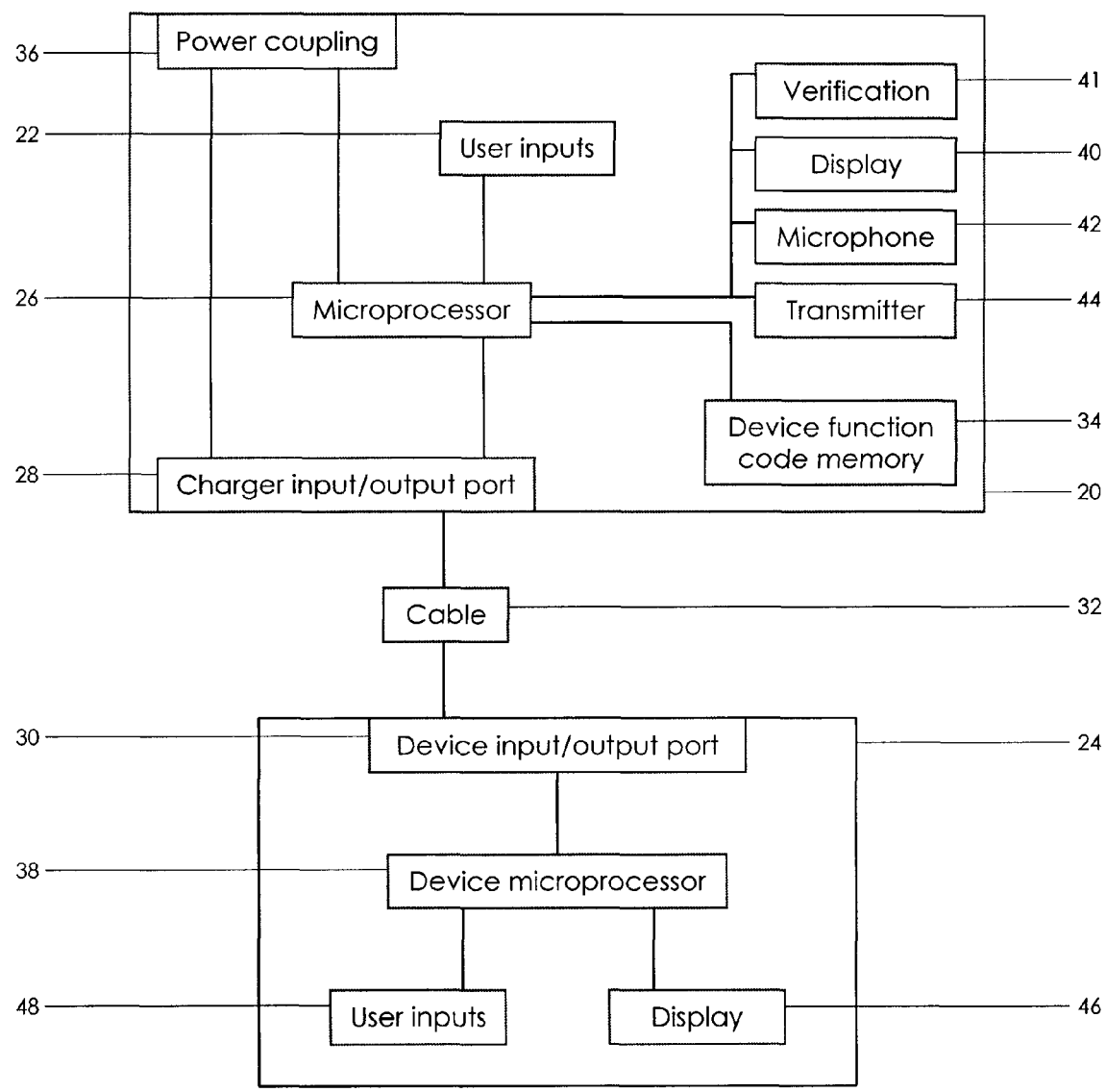
FIG. 2 is a block diagram of an accessory constructed in accordance with an embodiment of the present invention.

Referring now to FIG. 2, a block diagram of a charging accessory 20 having device controls 22 for a portable electronic device 24 constructed in accordance with an embodiment of the present invention is shown. The charger 20 is controlled by a microprocessor 26 that communicates with the device 24 through a charger input/output port 28 connected to cable 32 which couples to the device's input/output port 30 through a connector. For example, when used in conjunction with an iPod digital music player, the communication interface would be implemented through the 30-pin docking connector. The charger 20 is adapted to be coupled to a power source such as 12-volt car outlet through a power coupling 36 and ports 28 and 30 to the device 24. The charging accessory 20 includes a user input 22, such as a play button, that is manipulated by a user to select the play function of the device 24. The accessory 20 uses a function code memory 34 to store the codes that allow it to control the functions of the attached device. These codes are transferred to the device 24 through the cable 32. The device microprocessor 38 receives and interprets the codes and performs the functions corresponding to the received codes. Thus, if the device 16 is a digital music player such as an Apple iPod™, a user can use the charging accessory user inputs 22 to control the standard functions of the digital music player such as play, pause, rewind, fast forward, etc. However, a user can still use the device controls 48 if they prefer. Preferably, the charging accessory 20 is configured such that a user can just connect it to the portable electronic device 24 and power outlet and begin controlling the device without any additional required set-up. The charger also preferably includes a display 40 for displaying status information related to the requested functions such as the artist and title of the track currently playing. In addition, the charger microprocessor 26 can send codes to the device 24 such that a display 46 of the device 24 is altered or controlled.

In an alternative embodiment, the charger 20 may include a microphone 42 for detecting sound waves and producing an output signal based thereon. The output signal of the microphone 42 may be sampled by the microprocessor 26 to produce a digital data file which is transferred to the electronic device 24, or the analog signal from the microphone 42 may be provided directly to the device 24 itself depending upon the device's capabilities and the interface available. The device 24 then stores the data file in device memory for later retrieval. When so equipped, the charger 20 can then function as a voice recorder.

In yet another alternative embodiment, the charging accessory 20 includes a transmitter 44 that allows the accessory 20 to broadcast an audio signal received from the device 24 to a remote receiver such as a car radio. In such an embodiment, the transmitter 20 receives an output audio signal from the portable electronic device 24 and broadcast the signal to a remote receiver such that the output signal from the portable electronic device 24 is transferred to the remote receiver. The controls 22 on the accessory 20 are then used to control the music playing on the remote receiver.

In yet another embodiment, a transmitter 44 in the accessory can be used to establish a communication link with a receiver 43 in the device 24. The control codes can then be transmitted wirelessly from the accessory 20 to the device 24. However, as will be appreciated by those skilled in the art, if the device 24 and accessory 20 are not directly coupled, the accessory 20 will not be able to charge the device 24. In addition, the device 24 must be equipped with a receiver 43 to wirelessly receive data.

In yet another embodiment, the accessory 20 includes a verification system 41 that interacts with a verification system of the device 24 such that the device 24 can verify that the accessory 20 is produced by an authorized producer. The verification system 41 may be a software code that is accessed and validated or a verification chip or hardware that is interrogated by the device 24.

Figure 3A:
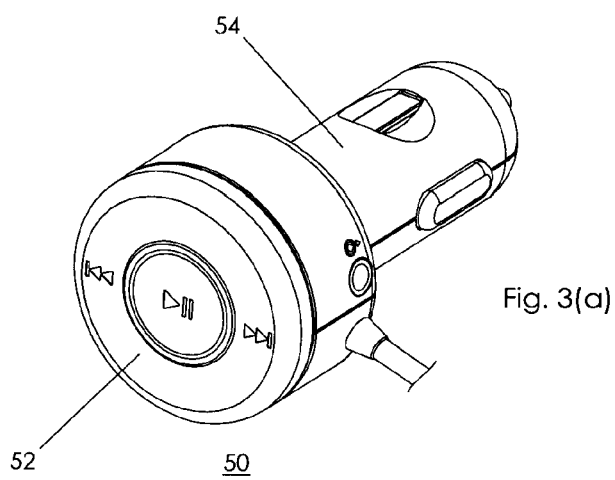
FIGS. 3(*a-c*) are perspective, side and front views of an accessory constructed in accordance with an embodiment of the present invention.
Figure 3B:
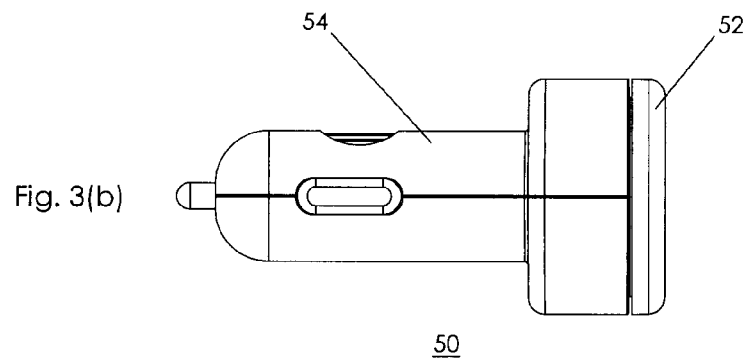
Figure 3C:
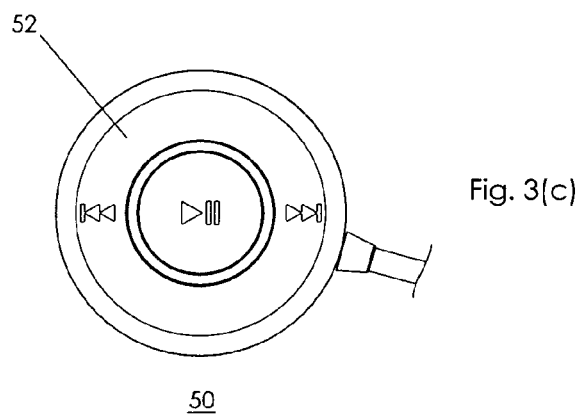

Referring now to FIGS. 3(a-c), perspective, side and front views of an accessory 50 constructed in accordance with an embodiment of the present invention are shown. The front face plate 52 of the adapter body 54 is a rotating controller 52 that can be used to control the accessory 50. The front face plate controller 52 preferably is a touch sensitive ring that performs like a standard click wheel controller for a digital music player. However, the controller 52 may be any type of rotational controller such as an encoder, position sensor, optical, inductive, resistive, capacitive, etc. The click wheel 52 is a touch-sensitive ring that is used to navigate through the portable media players menus and control its features. It provides two ways to input commands by either sliding your finger around the wheel 32 or pressing buttons located under and in the middle of the wheel. The mechanical buttons preferably control transport functions such as menu, back, forward, play/pause, and the button in the center select. In addition, the front face plate 52 can be rotated left and right to sequence through audio files stored on the player. In an especially preferred embodiment, the face plate 52 provides tactile feedback so that a user can feel when a selection has been made without taking their eyes off of the road. The charger body 54 can also vibrate to indicate that a selection is playing or the device is charging. If the embodiment includes a transmitter, the front face plate rotation can function as a tuning dial such that it is used to select the frequency of transmission.

While the particular designs discussed above with respect to FIGS. 1 through 3 are preferred, it will be readily appreciated by those skilled in the art that embodiments of the present invention can take many forms and that the embodiments shown are exemplary only. Thus, although there have been described particular embodiments of the present invention of a new and useful Auxiliary Power Adapter Having Device Controls, it is not intended that such references be construed as limitations upon the scope of this invention except as set forth in the following claims.

What is claimed is:

1. A charger for a portable electronic device comprising: a charger body dimensioned to couple with a 12 volt car outlet wherein a face of said charger body rotates such that a user can select a function of said portable electronic device by rotating said face of said charger body; and rotating face of said charger controls a pause, play, skip and rewind function of said digital music player.

2. The charger of claim 1 wherein said charger further comprises a transmitter for transmitting a frequency modulated output of said portable electronic device to a remote receiver.

3. The charger of claim 1 wherein said rotating face further comprises a click wheel.

4. The charger of claim 1 wherein said charger body contains a verification system that interacts with a verification system of said portable electronic device to insure that said charger is produced by an authorized partner of an entity producing said portable electronic device.

5. The charger of claim 1 wherein said rotating face provides tactile feed back to a user.

6. An accessory for a portable electronic device, said accessory comprising: a rotary controller positioned on a face of an accessory body adapted to fit in a 12-volt outlet whereby said accessory transfer control codes to said portable electronic device in response to a user's manipulation of said rotary-controller such that a user can implement functions on said portable electronic device with said rotary controller on said accessory; and wherein said accessory is a charger having a charger body configured to fit in a 12-volt car outlet and said rotary controller further comprises a protruding front face of said charger body.

7. The accessory of claim 6 wherein said rotary controller provides tactile feedback to a user.

8. The accessory of claim 6 wherein said accessory further comprises a transmitter for wirelessly transmitting device a frequency modulated output of said portable media player to a remote receiver.

9. The accessory of claim 6 wherein said device is a digital music player and said rotary controller allows a user to pause, play, rewind, or skip songs played by said digital music player.

10. The accessory of claim 6 wherein said accessory communicates with operating software of the portable electronic device such that the charger can control the functions of the portable electronic device.

11. The accessory of claim 6 further comprising a microphone such that a voice signal can be received with said microphone and stored on said portable electronic device.

12. The accessory of claim 6 further comprising a verification system for coupling with a verification system of said portable electronic device such that said portable electronic device can verify that said accessory is an authorized accessory.

13. The accessory of claim 6 wherein said rotary controller is a click wheel.

14. A charger for a portable media player, said charger comprising: a charger body for physically and electrically coupling to a 12-volt car outlet such that said charger transfers power from said 12-volt outlet to said portable media player wherein a protruding face of said charger body rotates and functions as a click wheel controller such that a user can control functions of said portable media player by manipulating said click wheel of said charger.

15. The charger of claim 14 further comprising a transmitter for transmitting a frequency modulated output of said portable media player to a remote receiver.

16. The charger of claim 14 wherein said click wheel allows a user to play, pause, rewind, or skip a song playing on said portable media player.

17. The charger of claim 14 wherein said charger contains a verification system that insures that said charger is compatible with said portable media player.

* * * * *